UNITED STATES PATENT OFFICE.

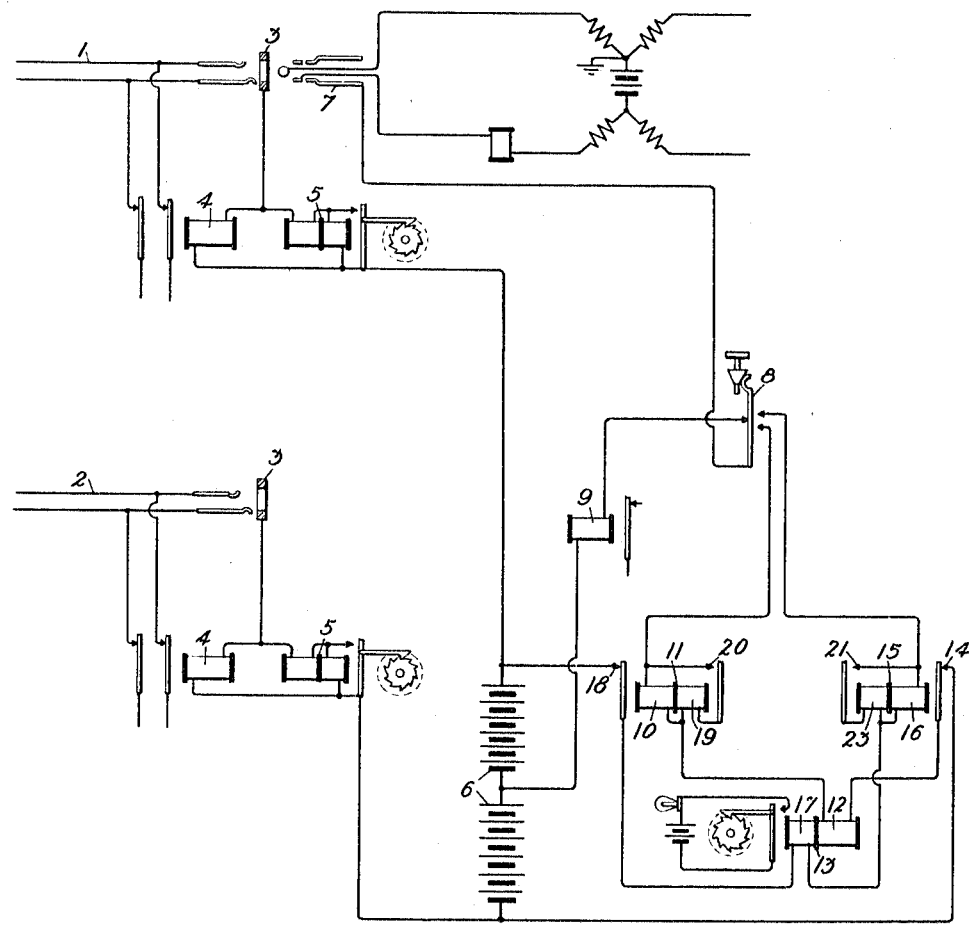

SAMUEL B. WILLIAMS, JR., OF BROOKLYN, NEW YORK, ASSIGNOR TO WESTERN ELECTRIC COMPANY, OF NEW YORK, N. Y., A CORPORATION OF ILLINOIS.

SERVICE-METER CIRCUIT FOR TELEPHONE-EXCHANGE SYSTEMS.

1,119,915.  Specification of Letters Patent.  Patented Dec. 8, 1914.

Application filed July 12, 1913. Serial No. 778,768.

*To all whom it may concern:*

Be it known that I, SAMUEL B. WILLIAMS, Jr., a citizen of the United States, residing at Brooklyn, in the county of Kings and State of New York, have invented a certain new and useful Improvement in Service-Meter Circuits for Telephone - Exchange Systems, of which the following is a full, clear, concise, and exact description.

This invention relates to a service meter circuit for telephone exchange systems.

This invention has application particularly to systems of the automatic or semi-automatic type, but relates to apparatus which may be either wholly or partially manually controlled and it is therefore described in connection with manually controlled apparatus.

It sometimes becomes important to distinguish between two classes of service, especially when connection is to be automatically established, by applying to the test, or other terminals of different lines, different characters of current, such for example as from the positive and negative poles of a central battery.

The object of this invention is to provide circuits and apparatus for the proper operation of line service meters in systems of the above character. These service meters are preferably connected either in multiple or in series, with the usual line cut-off relays, one terminal then being connected with the test terminal of the line, and the other terminal being connected either to the positive or the negative pole of the central battery. Service meters are preferably marginally actuated, that is they require the full potential of the battery over a circuit of comparatively low resistance, for their actuation.

This invention relates particularly to the means for automatically extending a low resistance circuit for the actuation of the service meter, to the opposite pole of battery from that to which the service meter is connected.

This invention is an improvement upon the invention of A. M. Bullard, patented August 9, 1910, No. 966,733.

The invention is illustrated in the accompanying drawing, in which all apparatus is shown in its normal or unactuated condition, and in which only such parts of the system are illustrated, as will be helpful for the complete understanding of the invention.

Subscriber's lines 1 and 2 are each provided with test contacts 3. The test contact of line 1 is connected through its cut-off relay 4 in parallel with its service meter 5 to the negative pole of the central battery 6, while the test contact of line 2 is connected through its cut-off relay 4 in parallel with its service meter 5 with the positive pole of central battery 6. The connecting circuit here shown is provided with a plug, but it may be provided with automatically movable contacts of a line finder switch if desired. The plug is provided with a contact 7 adapted to register with the test contacts 3 of calling lines. Contact 7 is normally connected through closed contacts of the service meter key 8, and the coil of relay 9, to the central point of battery 6, relay 9 being used for any purpose, such as to control cord circuit supervision. Service meter key 8 is provided with a pair of normally open contacts, one connected through the high resistance winding 10 of relay 11, the coil 12 of meter 13, and contacts 14 of relay 15, to the positive pole of battery 6. The other contact of the operator's service meter key 8 is connected through the coil 16 of relay 15, winding 17 of position service meter 13 and the contacts 18 of relay 11 to the negative pole of battery 6. Relay 11 is provided with a low resistance winding 19, and a pair of normally open contacts 20 adapted, when relay is actuated, to include winding 19 in parallel with the high resistance winding 10. Relay 15 is provided with a low resistance winding 23, and normally open contacts 21, adapted to include winding 23 in parallel with the high resistance winding 16, when relay 15 is actuated.

In the operation of the system, when connection is made with the contacts of line 1, a circuit is first established from the negative pole of battery 6 through cut-off relay 4 and service meter 5, in parallel, contacts 3 and 7 of the jack and plug, normally closed contacts of the key 8 and the coil of relay 9 to the middle point of battery 6. Current in this path is insufficient for the actuation of the service meter 5, but actuates relays 4 and 9, relay 4 serving the usual purpose of a cut-off relay, and relay 9 serving any desired purpose in the connector circuit.

When it has been finally determined that a call is to be registered, the key 8 is depressed, closing simultaneously the circuits of windings 10 and 16 of relays 11 and 15. By reason of the coil 16 of relay 15 being connected with the negative pole of battery 6, this coil is now connected in parallel with cut-off relay 4 and service meter 5, whereas the coil 10 of relay 11 is connected in series not only with cut-off relay 4 and service meter 5, but also with the coil 16 of relay 15. The current through the coil 10 of relay 11 is therefore so much greater than that through the coil 16 of relay 15, that the former is actuated, whereas the latter remains inert. Upon the actuation of relay 11, its contacts 18 are interrupted, and its contacts 20 are closed. The former interrupt the circuit through the coil 16 of relay 15, and the latter close a low resistance path through winding 19 of relay 11. This low resistance path permits the flow of sufficient current from the positive pole of battery 6 through contacts 14 of relay 15, coil 12 of service meter magnet 13, winding 19 and contact 20 of relay 11, contacts of the now actuated service meter key 8, contacts 7 and 3 of the plug and jack and the coil of service meter 5 to the negative pole of battery 6 to actuate both the line service meter 5 and the position service meter 13.

If the connection had been established with line 2 instead of with line 1, relays 9 and 4 would have been initially actuated, and upon the operation of service meter key 8, relay 15 would have been actuated. The circuit would then be closed from the negative pole of battery through contacts 18 of relay 11, coil 17 of service meter 13, coil 23 and contacts 21 of relay 15, contacts of the then actuated service meter key 8, contacts 7 and 3 of the plug and jack and the coil of the service meter 5 to the positive pole of battery. Current in this path would actuate the line service meter 5, and the position service meter 13.

It is to be understood that although this invention is shown and described in combination with a telephone system, and for the purpose of actuating a particular type of apparatus, viz., service meters, it may be elsewhere used and applied to other types of apparatus without departing from the spirit or scope of the invention.

Claims:

1. In a telephone system, the combination with a plurality of telephone lines, each having a marginal service meter associated therewith, and a terminal to which potential is applied through such meter, of an operator's connecting circuit for establishing connection with the terminal of any line, sources of current of different polarity associated with the operator's connecting circuit, a key for applying the same to operate the service meter of the line to which connection has been made, and non-polarized relay apparatus adapted automatically to select the source of current to be applied by said key.

2. In a telephone system, the combination with a pair of telephone lines, a source of current, a service meter for one line connected with one pole of said source, and a service meter for the other line connected with another pole of said source, a connecting circuit and means therein for completing the circuit of either of said service meters, comprising a pair of relays connected in branch circuits, one of said relays being shunted by the service meter with which connection is established, the other of said relays being actuated to sever the circuit of the first relay.

3. In a telephone system, a service meter, a circuit therefor, a source of current, a pair of branch circuits extending to opposite poles of said source, a relay in each branch, a pair of normally closed contacts for each relay controlling the branch circuit through the other relay, one of said relays being actuated in operation of said service meter to open the circuit of the other relay.

4. In a telephone system, the combination with a source of current, of a pair of electromagnets, one connected with one pole of said source and the other with another pole of said source, a pair of relays, one having its coil connected with one pole of said source and the other with the other pole of said source, and means to simultaneously complete the circuits of both of said relays through either of said electromagnets, one of said relays being actuated and the other shunted when connection is completed through one of said electromagnets, and the latter of said relays being actuated and the former shunted when connection is completed through the other of said electromagnets, and counter mechanism controlled by said electromagnets.

5. In a telephone system, the combination of a source of current, a pair of relays, the first having its winding connected through a contact of the second with the positive pole of said source, and the second having its winding connected through a normal contact of the first to the negative pole of said source, and means to connect the other terminals of each of said relays simultaneously with either pole of said source whereby one relay is energized and the other shunted, and a low resistance path closed by the relay which is energized to cause an increased flow of current in the circuit, and an electromagnet included in said circuit and actuated by the increased flow of current.

6. In a service meter system, a source of current, a pair of relays connected to opposite poles of said source, a pair of service meter coils connected to opposite poles of said source and means to connect both said relays with either of said service meter coils, the first relay being shunted and the second actuated when connection is established with one of said service meters, and the second relay being shunted and the first actuated when connection is established with the other of said service meters.

7. The combination with a source of current, of a pair of electromagnetic devices, connected one to each pole of said source, a conductor, means for including said conductor in series with one of said electromagnetic devices and said source, and in shunt of the other of said electromagnetic devices, and means controlled by the electromagnet in the series circuit for opening the shunt circuit.

8. In a telephone system, the combination with a plurality of telephone lines, each having a marginal service meter, of a connecting circuit for establishing connection with said line and its associated meter, sources of current of different polarity associated with the connecting circuit, means for applying said source to operate the service meter of the line to which connection has been made, and non-polarized relay apparatus adapted automatically to select the source of current to be applied by said means.

9. The combination with a source of current, of a pair of electromagnetic devices, connected one to each pole of said source, a conductor, means for including said conductor in series with either of said electromagnets and said source, and in shunt of the other of said electromagnets, and means under the control of the electromagnet included in the series circuit for opening the circuit of the electromagnet included in the shunt circuit.

10. The combination with a source of current, of a pair of electromagnetic devices, connected one to each pole of said source, a conductor, and means for including said conductor temporarily in series with either of said electomagnets and said source, and in shunt of the other of said electromagnets.

In witness whereof, I hereunto subscribe my name this 10th day of July A. D., 1913.

SAMUEL B. WILLIAMS, Jr.

Witnesses:
 ALICE HAZLEY,
 LAURA DORING.

Copies of this patent may be obtained for five cents each, by addressing the "Commissioner of Patents, Washington, D. C."